US012634059B2

(12) United States Patent (10) Patent No.: US 12,634,059 B2
Pu et al. (45) Date of Patent: May 19, 2026

(54) METHOD AND APPARATUS FOR PROCESSING BANDWIDTH PARTS AND TERMINAL

(71) Applicant: VIVO MOBILE COMMUNICATION CO., LTD., Guangdong (CN)

(72) Inventors: Wenjuan Pu, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 378 days.

(21) Appl. No.: 18/504,645

(22) Filed: Nov. 8, 2023

(65) Prior Publication Data

US 2024/0072954 A1 Feb. 29, 2024

Related U.S. Application Data

(63) Continuation of application No. PCT/CN2022/091436, filed on May 7, 2022.

(30) Foreign Application Priority Data

May 8, 2021 (CN) .......................... 202110502336.8

(51) Int. Cl.
 *H04W 4/00* (2018.01)
 *H04L 5/00* (2006.01)
(52) U.S. Cl.
 CPC .......... *H04L 5/0035* (2013.01); *H04L 5/0098* (2013.01)
(58) Field of Classification Search
 CPC ............... H04W 24/02; H04W 72/231; H04W 76/20; H04L 5/0035; H04L 5/0098;
 (Continued)

(56) References Cited

U.S. PATENT DOCUMENTS

2019/0132793 A1 5/2019 Lin
2019/0253230 A1 8/2019 Loehr et al.
 (Continued)

FOREIGN PATENT DOCUMENTS

CN 110324890 A 10/2019
CN 110830200 A 2/2020
 (Continued)

OTHER PUBLICATIONS

First Office Action for Chinese Application No. 202110502336.8, dated Aug. 24, 2023, 10 Pages.
Electronics World "Analysis of Network Slicing and BWP Technology in 5G Mobile Communication System" DOI:10.19353/j. cnki.dzsj, Jan. 2020, 2 Pages.
 (Continued)

*Primary Examiner* — Phuoc H Doan
(74) *Attorney, Agent, or Firm* — Foley & Lardner LLP

(57) ABSTRACT

A method for processing BWPs includes: executing, by a terminal, a first operation, when satisfying a first condition including at least one of: there is uplink data arriving at a SCG in a deactivated state; the terminal receives an SCG activation command; the terminal requests to activate the SCG; the SCG is activated; the terminal receives a BWP activation command; or in conversion process of the SCG from the deactivated state to an activated state, the first operation includes: activating a first target BWP of a first serving cell of the SCG; keeping the first serving cell of the SCG working in a first BWP; and executing BWP switching from the first BWP to the first target BWP for the first serving cell of the SCG, the first BWP being a BWP which the first serving cell works in or activates when the SCG is in the deactivated state.

20 Claims, 2 Drawing Sheets

Start

In a case that a first condition is satisfied, a terminal executes a first operation 201

End

(58) Field of Classification Search
CPC ................ H04L 5/0096; H04L 1/1812; H04B 17/328; H04B 7/0626
See application file for complete search history.

(56) References Cited

U.S. PATENT DOCUMENTS

| | | | |
|---|---|---|---|
| 2020/0351064 A1 | 11/2020 | Shi | |
| 2021/0014862 A1 | 1/2021 | Yue et al. | |
| 2021/0112457 A1 | 4/2021 | Zhang et al. | |
| 2021/0167934 A1* | 6/2021 | Fan | H04L 5/0098 |
| 2022/0159523 A1* | 5/2022 | Xu | H04W 24/10 |

FOREIGN PATENT DOCUMENTS

| | | |
|---|---|---|
| CN | 111526537 A | 8/2020 |
| CN | 111770511 A | 10/2020 |
| CN | 112399528 A | 2/2021 |
| CN | 112533235 A | 3/2021 |
| EP | 4013134 A1 | 6/2022 |
| WO | 2021027752 A1 | 2/2021 |
| WO | 2021063252 A1 | 4/2021 |

OTHER PUBLICATIONS

Vicent Selfa et al., Computer Engineering Department Universitat Politecnica de Valencia"A Simple Activation/Deactivation Prefetching Scheme for Chip Multiprocessors" 2016 24th Euromicro International Conference on Parallel, Distributed, and Network-Based Processing, Spain, 2016, 8 Pages.

International Search Report and Written Opinion for Application No. PCT /CN2022/091436, dated Aug. 3, 2022, 8 Pages.

InterDigital Inc. "On Support of Activation/Deactivation for SCG" 3GPP RAN WG2 Meeting #113-e, Electronic, Jan. 2021, R2-2101312, 5 Pages.

Extended European Search Report for Application No. 22806644.5, dated Oct. 17, 2024, 28 Pages.

ZTE Corporation, Sanechips "Further consideration on SCG deactivation and activation" 3GPP TSG-RAN WG2 Meeting #113 electronic, e-meeting, Feb. 2021, R2-2100568, 7 Pages.

OPPO "Open issues for activation of deactivated SCG" 3GPP TSG-RAN WG2 Meeting #113 bis electronic, Online, Apr. 2021, R2-2102899, 6 Pages.

InterDigital Inc. "Activation and Deactivation of SCG" 3GPP RAN WG2 Meeting #113-bis-e, Electronic, Apr. 2021, R2-2103681, 5 Pages.

* cited by examiner

Network side
device 11                    11

Terminal

Terminal

Start

In a case that a first condition is satisfied, a terminal
executes a first operation                                    201

End

Apparatus 300 for processing
bandwidth parts (BWPs)                                        300

First executing module                                        301

METHOD AND APPARATUS FOR PROCESSING BANDWIDTH PARTS AND TERMINAL

CROSS-REFERENCE TO RELATED APPLICATIONS

This application is a continuation of PCT International Application No. PCT/CN2022/091436 filed on May 7, 2022, which claims priority to Chinese Patent Application No. 202110502336.8 filed on May 8, 2021, which are incorporated herein by reference in their entireties.

TECHNICAL FIELD

This application belongs to the field of communications, and in particular relates to a method and apparatus for processing bandwidth parts (BWPs) and a terminal.

BACKGROUND

Dual connectivity (DC) refers to that resources of two network nodes (access network elements) are provided for user equipment (UE, also called a terminal), where one network node is called a master node (MN) and the other network node is called a secondary node (SN). At each network node, carrier aggregation (CA) is used, i.e., the UE is configured with a series of serving cells, also called a cell group, controlled by the node. A master cell group (MCG) is controlled by the MN and a secondary cell group (SCG) is controlled by the SN. Each cell group contains a special cell (SpCell) and a series of secondary cells (Scell). In the MCG, the special cell is called a primary cell (PCell); and in the SCG, the special cell is called a primary secondary cell (PSCell). In a cell group, the SpCell uses a master carrier while the other secondary cells use secondary carriers.

Release-16 (Rel-16) introduces the SCG suspended state, which allows the network to temporarily suspend the SCG when the UE has low data transmission or no data transmission over the SCG for a long period of time, instead of directly deleting the SCG and then adding it back when bigger data is available. Temporarily suspending the SCG allows the terminal to operate in a more power-saving manner for a longer period of time, while allowing the SCG to be restored more quickly when large amounts of data are required. During the standardization process of release-17 (Rel-17), SCG deactivation is used, i.e., the SCG activated/deactivated state. SCG deactivation can also be started when the terminal is overheated (overheating) or for the purpose of saving power. However, in the prior art, there is no corresponding scheme about how to handle the bandwidth part (BWP) of the serving cell of the SCG in the SCG deactivated/activated state, which cannot ensure the reliability of the communication between the terminal and a network side device.

SUMMARY

According to a first aspect, a method for processing bandwidth parts (BWPs) is provided, including:

in a case that a first condition is satisfied, executing, by a terminal, a first operation, where the first condition includes at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or, in the conversion process of the SCG from the deactivated state to an activated state, the first operation includes at least one of the following:

activating a first target BWP of a first serving cell of the SCG;

keeping the first serving cell of the SCG working in a first BWP; or, executing BWP switching from the first BWP to the first target BWP for the first serving cell of the SCG, the first BWP being a BWP which the first serving cell works in or activates when the SCG is in the deactivated state.

According to a second aspect, an apparatus for processing bandwidth parts (BWPs) is provided, and applied to a terminal, including:

a first executing module, configured to, in a case that a first condition is satisfied, execute a first operation, where the first condition includes at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation includes at least one of the following:

activating a first target BWP of a first serving cell of the SCG;

keeping the first serving cell of the SCG working in a first BWP; or executing BWP switching from the first BWP to the first target BWP for the first serving cell of the SCG, the first BWP being a BWP which the first serving cell works in or activates when the SCG is in the deactivated state.

According to a third aspect, a terminal is provided, the terminal including a processor, a memory, and programs or instructions stored on the memory and capable of running on the processor, the program or instruction, when executed by the processor, implementing steps of the method according to the first aspect.

According to a fourth aspect, a terminal is provided, including a processor and a communication interface, where the processor is configured to, in a case that a first condition is satisfied, execute a first operation, where the first condition includes at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation includes at least one of the following:

activating a first target BWP of a first serving cell of the SCG;

keeping the first serving cell of the SCG working in a first BWP; or executing BWP switching from the first BWP to the first target BWP for the first serving cell of the SCG, the first BWP being a BWP which the first serving cell works in or activates when the SCG is in the deactivated state.

According to a fifth aspect, a readable storage medium is provided, programs or instructions being stored on the readable storage medium, and the program or instruction, when executed by a processor, implementing steps of the method according to the first aspect.

According to a sixth aspect, a chip is provided, the chip including a processor and a communication interface, the communication interface being coupled to the processor, and the processor being configured to run programs or instructions to implement steps of the method according to the first aspect.

According to a seventh aspect, a computer program/ program product is provided, the computer program/program product being stored in a non-volatile storage medium and the program/program product being executed by at least one processor to implement steps of the method according to the first aspect.

DETAILED DESCRIPTION

The technical solutions in embodiments of this application are clearly described in the following with reference to the accompanying drawings in the embodiments of this application. Apparently, the described embodiments are merely some rather than all of the embodiments of this application. All other embodiments obtained by those of ordinary skill in the art based on the embodiments of this application fall within the protection scope of this application.

In the specification and claims of this application, terms "first" and "second" are used to distinguish similar objects, but are not used to describe a specific sequence or order. It is to be understood that terms used in this way are exchangeable in a proper case, so that the embodiments of this application can be implemented in an order different from the order shown or described herein, and the objects distinguished by "first" and "second" are usually of one type, and there is no limit to the number of objects, for example, the first object may be one or more than one. In addition, "and/or" used in this specification and the claims represents at least one of the connected objects, and the character "/" generally indicates an "or" relationship between the objects associated in the context.

It is to be noted that the technologies described in the embodiments of this application are not limited to the long term evolution (LTE)/LTE-advanced (LTE-A) system, and may further be applied to other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are often used interchangeably in the embodiments of this application, and the technologies described may be used for both the systems and radio technologies mentioned above, as well as for other systems and radio technologies. The following description describes a new radio (NR) system for exemplary purposes and uses the term NR for much of the following description, however, these technologies may also be used in applications other than applications of the NR system, such as 6th generation (6G) communication systems.

Figures 1, 2, 3:
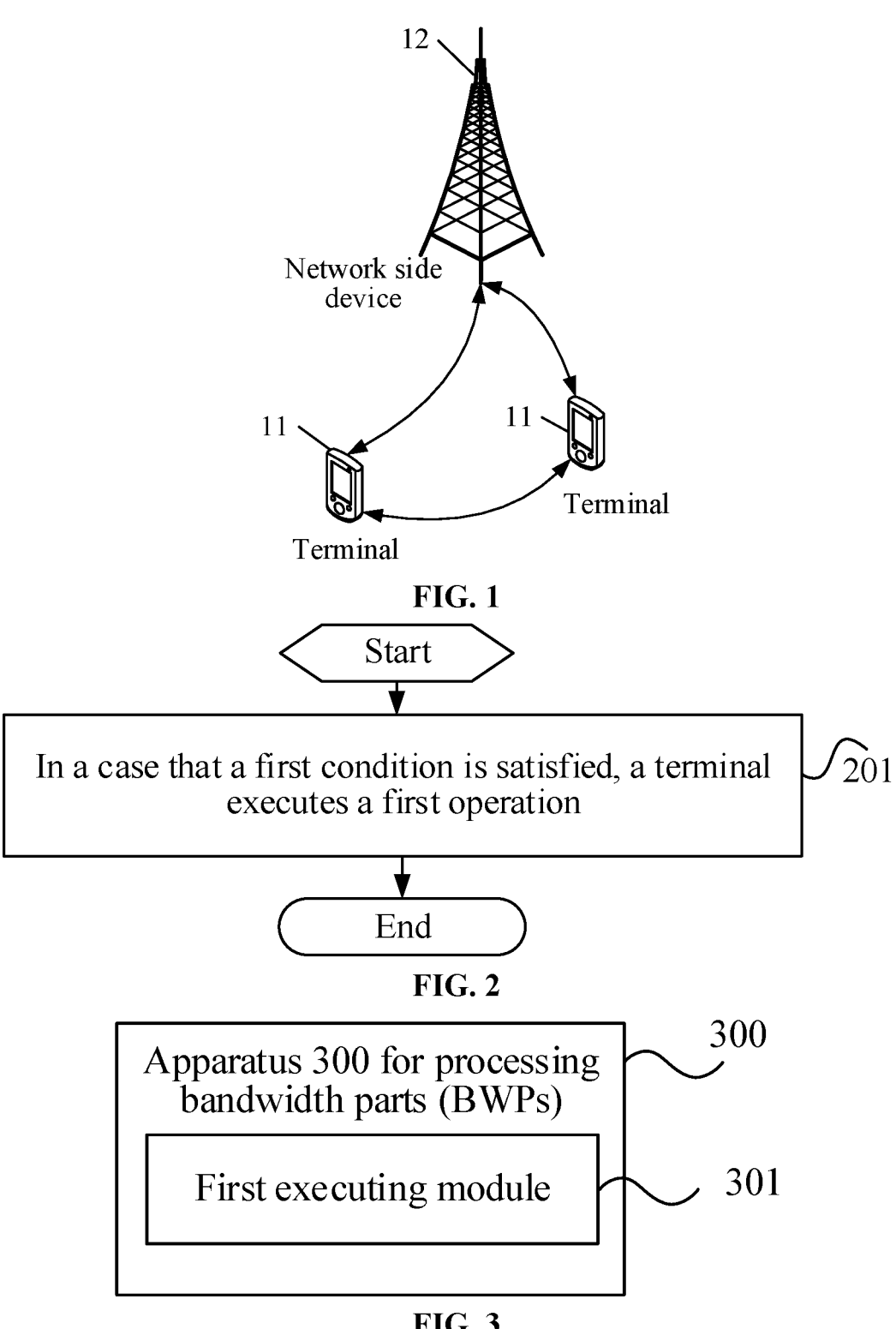
FIG. 1 is a block diagram of a wireless communication system to which can be applied in embodiments of this application.
FIG. 2 is a schematic diagram of the process of a method for processing bandwidth parts (BWPs) according to an embodiment of this application.
FIG. 3 is a schematic diagram of modules of an apparatus for processing bandwidth parts (BWPs) according to an embodiment of this application.

FIG. 1 is a block diagram of a wireless communication system to which can be applied in embodiments of this application. The wireless communication system includes terminals 11 and a network side device 12. The terminal 11 may also be called a terminal device or user equipment (UE). The terminal 11 may be a mobile phone, a tablet personal computer, a laptop computer or a notebook computer, a personal digital assistant (PDA), a palmtop, a netbook, an ultra-mobile personal computer (UMPC), a mobile Internet device (MID), a wearable device, or vehicle user equipment (VUE), pedestrian user equipment (PUE), and other terminal side devices. The wearable device includes: smart watches, wristbands, headphones, glasses, etc. It is to be noted that: the specific type of the terminal 11 is not limited in the embodiments of this application. The network side device 12 may be a base station or a core network. The base station may be referred to as a nodeB, an evolved NodeB, an access point, a base transceiver station (BTS), a radio base station, a radio transceiver, a basic service set (BSS), an extended service set (ESS), a NodeB, an evolutional NodeB (eNB), a home NodeB, a home evolutional NodeB, a wireless local area network (WLAN) access point, a wireless fidelity (WiFi) node, and a transmitting receiving point (TRP) or some other suitable terms in the field. As long as the same technical effect is achieved, the base station is not limited to a specific technical word. It is to be noted that: only a base station in the NR system is used as an example in the embodiments of this application, but the specific type of the base station is not limited.

A method and apparatus for processing bandwidth parts (BWPs) and a terminal provided by the embodiments of this application are described in detail below by means of some embodiments and the application scenarios thereof in conjunction with the accompanying drawings.

As shown in FIG. 2, an embodiment of this application provides a method for processing bandwidth parts (BWPs), including:

Step 201: In a case that a first condition is satisfied, a terminal executes a first operation.

Herein, it is to be noted that: the first condition is satisfied referring to that the terminal determines the need for a secondary cell group (SCG) to change from a deactivated state to an activated state or the terminal determines the need for a BWP to be activated.

Specifically, the first condition includes at least one of the following:

A11: there is uplink data arriving at the SCG in the deactivated state;

A12: the terminal receives an SCG activation command;

A13: the terminal requests to activate the SCG;

A14: the SCG is activated;

A15: the terminal receives a bandwidth part (BWP) activation command; or

A16: in the conversion process of the SCG from the deactivated state to the activated state.

It is to be noted that: A11-A14 and A16 described above can be understood as the need for the SCG to change from the deactivated state to the activated state; A15 may be understood as determining the need to activate the BWP.

That there is uplink data arriving at the SCG in the deactivated state (corresponding to A11) may be at least one of signaling radio bearers (SRBs) or data radio bearers (DRBs) for the uplink data to arrive at the SCG. The SRB includes a split signaling radio bearer (split SRB), and SRB3. And the DRB includes a master node/secondary node terminated SCG bearer (MN/SN terminated SCG bearer) and a master node/secondary node terminated split bearer (MN/SN terminated split bearer).

The terminal receives the SCG activation command (corresponding to A12), which can be a radio resource control (RRC) message, a media access control-control element (MAC CE), and downlink control information (DCI), or which can be activated implicitly (e.g., the terminal is implicitly instructed to activate the SCG in a case that a network reconfigures the SCG without carrying the SCG state).

That the terminal requests to activate the SCG (corresponding to A13) can be that the terminal initiates a random access or scheduling request (Scheduling Request, SR) on the SCG.

That the terminal receives the bandwidth part (BWP) activation command (corresponding to A15) can be understood as that when the terminal receives the SCG activation command, there is no activated BWP, and after receiving the BWP activation command, the terminal activates a BWP indicated by the network.

It is to be noted that: the BWP involved in the first condition is the BWP of the serving cell on the configured grant (CG), e.g. a PSCell in the SCG, and then a physical uplink control channel (PUCCH) SCell in the SCG. Optionally, the first condition further includes activating the SCG/PSCell during RRC connection restoration, restoring the SCG into the activated state, restoring the SCG and restoring the PSCell into the activated state, and adding/re-configuring one SCG in the activated state.

Optionally, the first operation includes at least one of the following:

B11: A first target BWP of a first serving cell of the SCG is activated.

It is to be noted that: the first serving cell includes: the PSCell and/or the SCell in the SCG, the SCell including the PUCCH SCell and an SCell that is not configured with a PUCCH resource; that is, the first serving cell is at least one cell in the SCG, e.g., the first serving cell is the PSCell.

B12: The first serving cell of the SCG is kept working in a first BWP.

It is to be noted that: the first BWP is mainly referred to as a BWP which the first serving cell works in or activates when the SCG is in the deactivated state. According to another embodiment, the SCG of the terminal receives an SCG deactivation command when working in the BWP1 in the activated state, and the SCG is set to in the deactivated state, at this moment, the BWP1 is still in the activated state. During the SCG deactivation period, the UE receives a BWP switching command to switch from the BWP1 to a BWP2

(i.e., the BWP1 is deactivated and the BWP2 is activated), at this moment, the UE receives an SCG activation command, and the UE should work in the BWP2, i.e., the first BWP is the BWP2 at this moment. The first BWP can also be understood as the BWP in which the first serving cell of the SCG of the terminal works when the first condition is satisfied or before the first condition is satisfied.

B13: BWP switching from the first BWP to the first target BWP is executed for the first serving cell of the SCG.

It is to be noted that: In a case that there is no activated BWP on the SCG during the SCG is in the deactivated state, then the UE needs to execute B11 when the first condition is satisfied, and in a case that there is an activated BWP on the PSCell during the SCG is in the deactivated state, then the terminal needs to execute B13.

It is to be understood that the terminal may only execute one of B11-B13 at the same moment. Optionally, a power headroom report (PHR) is triggered when the first condition is satisfied, e.g. the PHR of the SCG is triggered.

Optionally, the first target BWP mentioned in this embodiment of this application includes one of the following:

B21: A first active BWP.

It is to be noted that: in a case that a network side device configures the first active BWP for the terminal, the terminal may activate the first active BWP in a case that the first condition is satisfied. Optionally, the first active BWP may be a first active uplink/downlink bandwidth part (first active UL/DL BWP). It is to be understood that the terminal receives configuration parameters of the first active BWP, and in a case that the SCG is about to be in the deactivated state or kept in the deactivated state, the terminal saves the configuration parameters of the first active BWP and waits until the SCG is activated to activate the BWP immediately.

B22: A fourth BWP.

It is to be noted that: the fourth BWP is a BWP used when the SCG is activated.

Optionally, the fourth BWP may be pre-configured by the network side device, and may also be a BWP which the network side device transmits to the terminal together with the SCG activation command when transmitting the SCG activation command, for example, the fourth BWP is carried in the SCG activation command; and the fourth BWP may also be protocol agreed.

B23: A default BWP.

Optionally, in a case that the network side device configures the default BWP for the terminal, the terminal may activate the default BWP in a case that the first condition is satisfied.

B24: An initial BWP.

Optionally, in a case that B21, B22 or B23 is not configured, or B21 or B23 is configured, but the terminal does not have physical uplink control channel (PUCCH) resources and/or physical random access channel (PRACH) resources on the SCG, and the terminal may activate the initial BWP in a case that the first condition is satisfied.

B25: A dormant BWP.

B26: A BWP configured with a second resource.

Optionally, the second resource includes at least one of the following:

B261: a PUCCH resource;

B262, a PRACH resource;

B263: a channel state information (CSI) measurement resource; or

B264: a CSI report resource.

B27: A BWP saved by the terminal that was used last time in the activated state.

It is further to be noted that: after the terminal enables the SCG to work on an activated BWP through the operation of B11, B12 or B13, the terminal may initiate a random access or transmit an SR on the activated BWP. It is to be understood that after enabling the SCG to work on the activated BWP through the first operation, the terminal may transmit and receive data and/or signaling on the BWP.

The embodiments of this application are described in detail as follows, respectively in the case of different first operations.

I. In a case that the first operation is activating the first target BWP of the first serving cell of the SCG, it is to be noted that: in such a case, the terminal is configured such that the PSCell has no active BWP during the SCG deactivation period.

In such a case, optionally, one implementation way is that before the step 201, the method further includes:

the terminal receives network configuration information, and executes, based on the network configuration information, a second operation, where the network configuration information is used for configuring configuration parameters of a first activate BWP of a primary secondary cell; and the second operation is that the terminal does not activate a BWP indicated by the configuration parameters of the first activate BWP.

It is to be noted that: the BWP indicated by the configuration parameters of the first activate BWP is not activated described in this embodiment of this application referring to that the terminal does not immediately activate the BWP indicated by the configuration parameters of the first activate BWP, or that the BWP indicated by the configuration parameters of the first activate BWP is not activated in the period during the SCG is in the deactivated state. Optionally, the configuration parameters of the first active BWP may be configuration parameters of the first active uplink/downlink bandwidth part (first active UL/DL BWP).

It is to be further noted that: optionally, the timing for the terminal to receive the network configuration information includes at least one of the following:

C11: In a case that the SCG is in the deactivated state;

this case means that when the SCG is in the deactivated state, the network side device transmits the network configuration information for the configuration parameters of the first active BWP of the primary secondary cell, at this moment, the terminal does not immediately activate the BWP indicated by the configuration parameters of the first active BWP.

C12: In a case that the SCG is added to the deactivated state;

this case means that when there is an SCG addition and the added SCG is set to be in the deactivated state, and the network side device carries the network configuration information for the configuration parameters of the first active BWP for the primary secondary cell together with the added configuration information for the SCG, at this moment, the terminal does not immediately activate the BWP indicated by the configuration parameters of the first active BWP.

C13: In a case that the terminal receives the SCG deactivation command;

this case means that when the terminal receives the SCG deactivation command, and the network side device carries the network configuration information for the configuration parameters of the first active BWP of the primary secondary cell together with the SCG deactivation command, at this moment, the terminal does not immediately activate the BWP indicated by the configuration parameters of the first active BWP.

In such a case, optionally, another implementation way is that before the step 201, the method further includes:

in a case that the SCG of the terminal is in the activated state and the primary secondary cell works in a second BWP, the second BWP of the primary secondary cell is deactivated after the terminal receives the SCG deactivation command.

Optionally, the implementation way described above for deactivating the second BWP of the primary secondary cell includes one of the following:

C21: In a case that the SCG deactivation command contains the configuration parameters of the first active BWP for the primary secondary cell, the terminal switches from the second BWP to the BWP indicated by the configuration parameters of the first active BWP, and deactivates the BWP indicated by the configuration parameters of the first active BWP.

It is to be noted that: the specific operational behavior of the terminal to switch from the second BWP to the BWP indicated by the configuration parameters of the first active BWP is that: the terminal first deactivates the second BWP of the primary secondary cell and then activates the BWP indicated by the configuration parameters of the first active BWP.

C22: In a case that the SCG deactivation command does not contain the configuration parameters of the first active BWP of the primary secondary cell, the terminal deactivates the second BWP of the primary secondary cell and saves the second BWP.

Specific Application Scenario I

Step S101: The terminal receives the network configuration information, and the network configuration information includes an SCG added configuration and a deactivation indication for the added SCG.

Step S102: The terminal saves the SCG added configuration and sets the added SCG to be in the deactivated state. In a case that the network configuration information is also used for configuring configuration parameters of the first active UL/DL BWP, the terminal does not immediately activate the BWP indicated by the configuration parameters of the first active UL/DL BWP.

Step S103: The terminal activates the first target BWP of the first serving cell of the SCG in a case that the first condition is satisfied.

For example, the terminal activates the first active UL/DL BWP of the PSCell of the SCG.

Specific Application Scenario II

Step S201: The SCG of the terminal is in the activated state and the PSCell works on a certain BWP, for example, BWP1.

Step S202: The terminal, after receiving the SCG deactivation command, deactivates the BWP1 of the PSCell.

Optionally, the terminal also executes one of the following operations:

in a case that the SCG deactivation command contains the configuration parameters of the first active UL/DL BWP, the terminal saves the configuration parameters of the first active UL/DL BWP, but does not immediately activate the BWP indicated by the configuration parameters of the first active UL/DL BWP, or the terminal first executes BWP switching (switched from the BWP1 to the first active BWP) and then executes BWP deactivation (deactivating the first active BWP);

in a case that the SCG deactivation command does not contain the configuration parameters of the first active UL/DL BWP, the terminal saves the BWP1 for use in next SCG activation.

Step S203: The terminal activates the first target BWP of the first serving cell of the SCG in a case that the first condition is satisfied.

For example, the terminal activates the first active UL/DL BWP of the PSCell of the SCG.

Specific Application Scenario III

Step S301: The SCG of the terminal is in the deactivated state and the PSCell has no active BWP.

Step S302: The terminal receives network configuration information from the PSCell for configuring the configuration parameters of the first active UL/DL BWP, and the terminal does not immediately activate the BWP indicated by the configuration parameters of the first active UL/DL BWP.

Step S303: The terminal activates the first target BWP of the first serving cell of the SCG in a case that the first condition is satisfied.

For example, the terminal activates the first active UL/DL BWP of the PSCell of the SCG.

II. In a case that the first operation is keeping the first serving cell of the SCG working in the first BWP and/or executing BWP switching from the first BWP to the first target BWP for the first serving cell of the SCG, it is to be noted that: in such a case, the terminal is configured such that the PSCell has an active BWP during the SCG deactivation period.

In such a case, optionally, one implementation way is that before the step 201, the method further includes:

in a case that the SCG of the terminal is in the activated state and the primary secondary cell works in a fifth BWP, the terminal, after receiving the SCG deactivation command, executes a third operation.

It is to be noted that: the third operation includes one of the following:

D11: The first serving cell of the SCG is kept working in the fifth BWP.

It is to be noted that: the first serving cell includes: the PSCell and the SCell in the SCG. The fifth BWP mainly refers to the BWP which the first serving cell works in or activates when the SCG is in the activated state, such operation means that when the SCG of the terminal is in the activated state, no BWP switching is carried out after the SCG deactivation command is received, and the first serving cell still works in the fifth BWP when the SCG of the terminal is in the deactivated state, that is, the fifth BWP becomes a BWP which the first serving cell works in or activates when the SCG of the terminal is in the deactivated state.

D12: BWP switching from the fifth BWP to the first BWP is executed for the first serving cell of the SCG by the terminal.

It is to be noted that: the first BWP may be configured by the network side device or protocol agreed.

Optionally, the BWP includes, but is not limited to, one of the following:

D21: A third BWP.

It is to be noted that: the third BWP is a BWP used when the SCG is in the deactivated state.

Optionally, the third BWP may be pre-configured by the network side device and may also be a BWP which the network side device transmits to the terminal together with the SCG deactivation command when transmitting the SCG deactivation command, for example, the third BWP is carried in the SCG deactivation command.

D22: A BWP configured with a first resource.

It is to be noted that: the first resource is used for at least one of the following:

radio link monitoring (RLM), beam failure detection (BFD), beam management, CSI measurement, CSI report, random access, PUCCH transmission, physical uplink shared channel (PUSCH) transmission, or sounding reference signal (SRS) transmission.

D23: A default BWP.

Optionally, in a case that the default BWP is configured, the terminal may switch to the default BWP.

D24: A Dormant BWP.

Optionally, in a case that the Dormant BWP is configured, the terminal may switch to the Dormant BWP. Optionally, whether D25 is supported or not is also configured by the network side device.

D25: An initial BWP.

Optionally, in a case that D21, D22, D23 and D24 are not satisfied, the terminal can switch to the initial BWP.

D26: A first active BWP.

Optionally, in the process that the terminal executes the third operation, the terminal also needs to save the fifth BWP.

Optionally, in a case that the terminal receives the configuration parameters of the first active BWP when the SCG is in the deactivated state, the terminal executes a fourth operation.

The fourth operation includes one of the following:

D31: The BWP indicated by the configuration parameters of the first activate BWP is activated.

That is, when the terminal receives the configuration parameters of the first active BWP during the SCG is in the deactivation period, the terminal immediately activates the BWP indicated by the configuration parameters of the first active BWP.

D32: The BWP indicated by the configuration parameters of the first active BWP is activated after the SCG is activated.

That is, when the terminal receives the configuration parameters of the first active BWP when the SCG is in the deactivation period, the terminal does not immediately activate the BWP indicated by the configuration parameters of the first active BWP, but activates the BWP indicated by the configuration parameters of the first active BWP after the SCG is activated.

Specific Application Scenario IV

Step S401: The SCG is in the activated state, and works in a certain BWP (e.g., BWP1).

Step S402: The terminal executes D11 or D12 described above after receiving the SCG deactivation command.

Optionally, in the process that step S402 is executed, the terminal needs to save the BWP1.

Optionally, in a case that the SCG deactivation command contains the configuration parameters of the first active UL/DL BWP, the terminal immediately activates the BWP indicated by the configuration parameters of the first active UL/DL BWP; or, the terminal does not immediately activate the BWP indicated by the configuration parameters of the first active UL/DL BWP, but activates the BWP indicated by the configuration parameters of the first active UL/DL BWP after the SCG is activated.

Step S403: In a case that the first condition is satisfied, the terminal executes B12 or B13 described above.

Optionally, in step S402, the terminal executes D11, the terminal keeps the PScell of the SCG working in the BWP1, and in a case that the first condition is satisfied, the terminal may execute B12 and continues to keep the PScell of the SCG working in the BWP1; and the terminal may also execute B13 to switch from the BWP1 to the first active BWP.

Optionally, in step S402, the terminal executes D12, the terminal switches from the BWP1 to the default BWP, and in a case that the first condition is satisfied, the terminal may execute B12 and continues to keep the PScell of the SCG working in the default BWP; and the terminal may also execute B13 to switch from the default BWP to the first active BWP.

III. In a case that the first operation is activating the first target BWP of the first serving cell of the SCG, and keeping the first serving cell of the SCG working in the first BWP or executing BWP switching from the first BWP to the first target BWP for the first serving cell of the SCG.

In such a case, optionally, one implementation way is that before the step 201, the method further includes:

in a case that the SCG is in the activated state, the terminal receives the SCG deactivation command and executes a fifth operation.

Optionally, an implementation way for the terminal to execute the fifth operation is:

the terminal receives first configuration information transmitted by the network side device, and in a case that the first configuration information indicates the fifth operation, the terminal executes the fifth operation.

It is to be noted that: the fifth operation includes, but is not limited to, one of the following:

E11: In a case that the BWP-inactivity timer (bwp-InactivityTimer) is in operation, the BWP-inactivity timer is stopped;

E12: the BWP-inactivity timer is not stopped, and after the BWP-inactivity timer times out, BWP switching is not executed;

E13: the BWP-inactivity timer is not stopped, and after the BWP-inactivity timer times out, BWP switching is not executed in a case that the terminal is configured with the default BWP, otherwise BWP switching is not executed.

Optionally, in a case that the terminal is configured with the default BWP, it is also necessary to determine whether the first resource is configured on the default BWP or not, and in a case that the first resource is configured on the default BWP, BWP switching is executed, otherwise, BWP switching is not executed.

E14: The BWP-inactivity timer is not stopped, and after the BWP-inactivity timer times out, BWP switching is executed in a case that the terminal is not configured with the default BWP, otherwise, BWP switching is not executed.

Optionally, in a case that the terminal is configured with the default BWP, it is also necessary to determine whether the first resource is configured on the initial BWP or not, and in a case that the first resource is configured on the initial BWP, BWP switching is executed, otherwise, BWP switching is not executed.

It is to be noted that: the first resource in E13 and E14 is used for at least one of the following:

RLM, BFD, beam management, CSI measurement, CSI report, random access, PUCCH transmission, PUSCH transmission, or SRS transmission.

Specific Application Scenario V

Step S501: When the SCG is in the activated state, the terminal receives a BWP switching command, executes BWP switching, and starts the bwp-InactivityTimer.

Step S502: The terminal receives the SCG deactivation command, and executes any one of E11-E14 described above.

Step S503: In a case that the first condition is satisfied, the terminal executes B11, B12 or B13 described above.

It is to be noted that: this embodiment of this application can avoid that the terminal executes wrong activation/deactivation/switching operations on the PSCell BWP when the SCG is deactivated, and ensure that the terminal can work in an appropriate BWP when the SCG is activated for the purpose of stably and fast activating the SCG.

It is to be noted that: in the method for processing BWPs provided by this embodiment of this application, an execution body may be the apparatus for processing BWPs, or, a control module in the apparatus for processing BWPs for executing the method for processing BWPs. In this embodiment of this application, the apparatus for processing BWPs provided by this embodiment of this application is illustrated by taking that the apparatus for processing BWPs executes the method for processing BWPs as an example.

As shown in FIG. 3, an embodiment of this application provides an apparatus 300 for processing bandwidth parts (BWPs), including:

a first executing module 301, configured to, in a case that a first condition is satisfied, execute a first operation.

The first condition includes at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation includes at least one of the following:

a first target BWP of a first serving cell of the SCG is activated;

the first serving cell of the SCG is kept working in a first BWP; or

BWP switching is executed from the first BWP to the first target BWP for the first serving cell of the SCG, and the first BWP is a BWP which the first serving cell works in or activates when the SCG is in the deactivated state.

Optionally, in a case that the first operation is activating the first target BWP of the first serving cell of the SCG, before the first executing module 301 executes the first operation, the apparatus further includes:

a receiving module, configured to receive network configuration information; and a second executing module, configured to, based on the network configuration information, execute a second operation.

The network configuration information is used for configuring configuration parameters of a first activate BWP of a primary secondary cell; and the second operation is that the terminal does not activate a BWP indicated by the configuration parameters of the first activate BWP.

Optionally, the timing for the receiving module to receive the network configuration information includes at least one of the following:

in a case that the SCG is in the deactivated state;

in a case that the SCG is added to the deactivated state; or in a case that the terminal receives the SCG deactivation command.

Optionally, in a case that the first operation is activating the first target BWP of the first serving cell of the SCG, before the first executing module 301 executes the first operation, the apparatus further includes:

a third executing module, configured to, in a case that the SCG of the terminal is in the activated state and the primary secondary cell works in a second BWP, deactivate the second BWP of the primary secondary cell after the SCG deactivation command is received.

Optionally, the third executing module is configured to implement one of the following:

in a case that the SCG deactivation command contains the configuration parameters of the first active BWP of the primary secondary cell, the terminal switches from the second BWP to the BWP indicated by the configuration parameters of the first active BWP, and deactivates the BWP indicated by the configuration parameters of the first active BWP; and in a case that the SCG deactivation command does not contain the configuration parameters of the first active BWP of the primary secondary cell, the terminal deactivates the second BWP of the primary secondary cell and saves the second BWP.

Optionally, in a case that the first operation is keeping the first serving cell of the SCG working in the first BWP and/or executing BWP switching from the first BWP to the first target BWP for the first serving cell of the SCG, before the first executing module 301 executes the first operation, the apparatus further includes:

a fourth executing module, configured to, in a case that the SCG of the terminal is in the activated state and the primary secondary cell works in a fifth BWP, execute a third operation after the SCG deactivation command is received.

The third operation includes one of the following:

The first serving cell of the SCG is kept working in the fifth BWP; and

BWP switching from the fifth BWP to the first BWP is executed for the first serving cell of the SCG by the terminal.

Optionally, the first BWP includes one of the following:

a third BWP, the third BWP being a BWP used when the SCG is in the deactivated state;

a BWP configured with a first resource;

a default BWP;

an initial BWP;

a dormant BWP; and a first active BWP.

Optionally, the apparatus further includes:

a saving module, configured to save the first BWP by the terminal.

Optionally, the apparatus further includes:

a fifth executing module, configured to, in a case that the configuration parameters of the first active BWP are received when the SCG is in the deactivated state, execute a fourth operation.

The fourth operation includes one of the following:

the BWP indicated by the configuration parameters of the first activate BWP is activated; and the BWP indicated by the configuration parameters of the first active BWP is activated after the SCG is activated.

Optionally, the first target BWP includes one of the following:

the first active BWP;

a fourth BWP, the fourth BWP being a BWP used when the SCG is activated;

the default BWP;

the initial BWP;

the dormant BWP;

a BWP configured with a second resource; and a BWP saved by the terminal that was used last time in the activated state.

Optionally, the second resource includes at least one of the following:

a physical uplink control channel (PUCCH) resource;

a physical random access channel (PRACH) resource;

a channel state information (CSI) measurement resource; or a CSI report resource.

Optionally, before the first executing module 301 executes the first operation, the apparatus further includes:

a sixth executing module, configured to, in a case that the SCG is in the activated state, receive the SCG deactivation command and execute a fifth operation.

The fifth operation includes one of the following:

in a case that the BWP-inactivity timer is in operation, the BWP inactivity timer is stopped;

the BWP-inactivity timer is not stopped, and after the BWP-inactivity timer times out, BWP switching is not executed;

the BWP-inactivity timer is not stopped, and after the BWP-inactivity timer times out, BWP switching is executed in a case that the terminal is configured with the default BWP, otherwise BWP switching is not executed; and the BWP-inactivity timer is not stopped, and after the BWP-inactivity timer times out, BWP switching is executed in a case that the terminal is not configured with the default BWP, otherwise, BWP switching is not executed.

Optionally, the sixth executing module includes:

a receiving unit, configured to receive first configuration information transmitted by a network side device; and an executing unit, configured to, in a case that the first configuration information indicates the fifth operation, execute the fifth operation.

Optionally, the first resource is used for at least one of the following:

radio link monitoring (RLM), beam failure detection (BFD), beam management, channel state information (CSI) measurement, CSI report, random access, physical uplink control channel (PUCCH) transmission, physical uplink shared channel (PUSCH) transmission, or sounding reference signal (SRS) transmission.

It is to be noted that: by limiting the terminal by reasonably processing the BWP of the serving cell of the SCG from the deactivated state to the activated state and from the activated state to the deactivated state, the network communication process is improved in this way, and the reliability of communication between the terminal and the network side device can be ensured.

The apparatus for processing BWPs in this embodiment of this application may be an apparatus, an apparatus or electronic device with an operating system, or a component in a terminal, an integrated circuit or a chip. The apparatus or electronic device may be a mobile terminal or may be a non-mobile terminal. Exemplarily, the mobile terminal may include, but not limited to the type of the terminal 11 illustrated above; the non-mobile terminal can be a server, a network attached storage (NAS), a personal computer (PC), a television (TV), a teller machine, or a self-service machine, which is not specifically limited in this embodiment of this application.

The apparatus for processing BWPs provided by this embodiment of this application can implement various processes implemented by the method embodiment of FIG. 2, and achieve the same technical effect. To avoid repetition, details are not described herein again.

An embodiment of this application further provides a terminal, including a processor and a communication interface. The processor is configured to, in a case that a first condition is satisfied, execute a first operation.

The first condition includes at least one of the following:
there is uplink data arriving at a secondary cell group (SCG) in a deactivated state;
the terminal receives an SCG activation command;
the terminal requests to activate the SCG;
the SCG is activated;
the terminal receives a bandwidth part (BWP) activation command; or
in the conversion process of the SCG from the deactivated state to an activated state,
the first operation includes at least one of the following:
a first target BWP of a first serving cell of the SCG is activated;
the first serving cell of the SCG is kept working in a first BWP; and
BWP switching from the first BWP to the first target BWP is executed for the first serving cell of the SCG, or
the first BWP is a BWP which the first serving cell works in or activates when the SCG is in the deactivated state.

Figure 4:
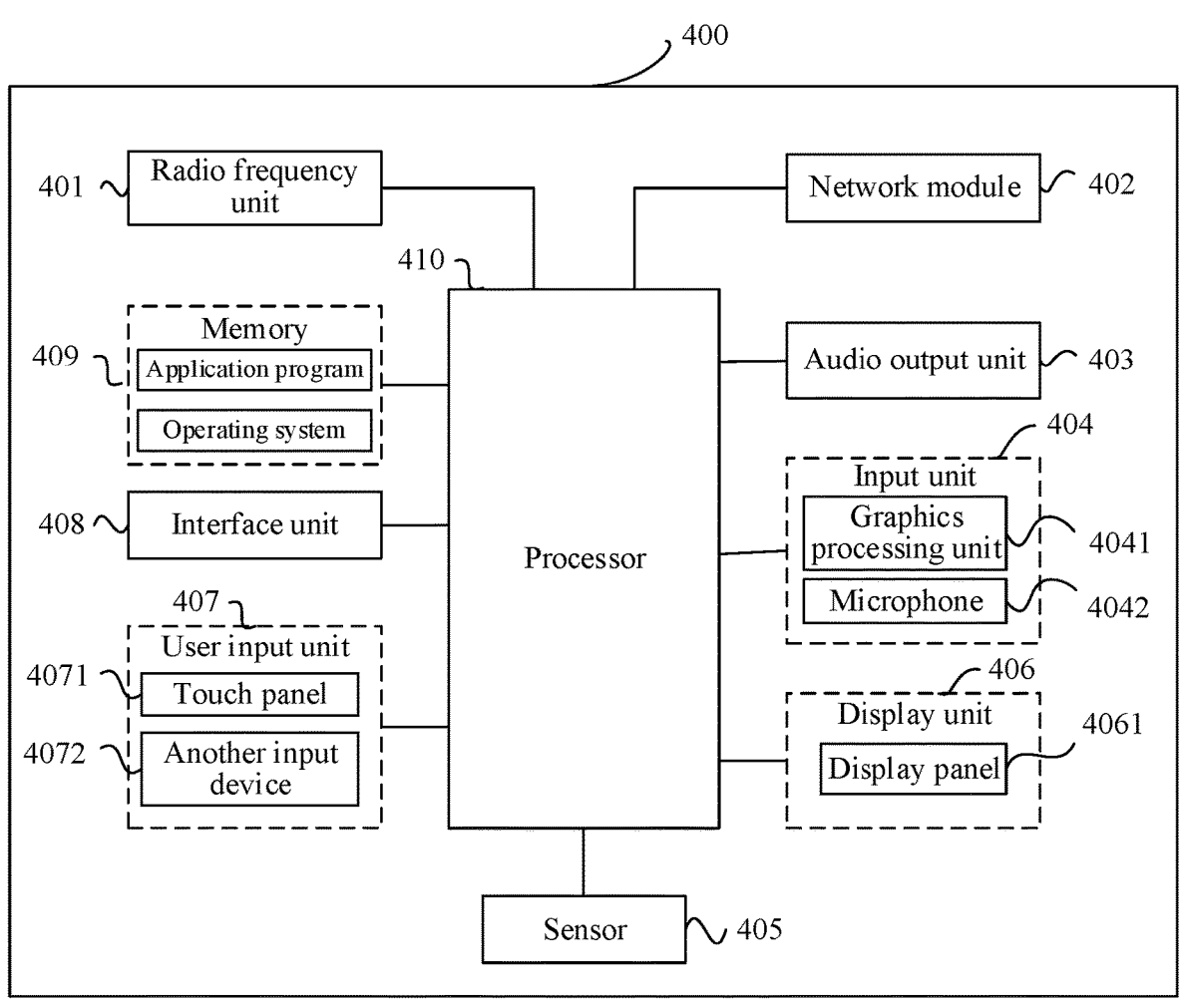
FIG. 4 is a structural block diagram of a terminal according to an embodiment of this application.

The terminal embodiment corresponds to the above terminal side method embodiment, each implementation process and implementation way of the above method embodiment can be applied in the terminal embodiment, and the same technical effect can be achieved. Specifically, FIG. 4 is a schematic diagram of a hardware structure of a terminal implementing the embodiments of this application.

The terminal 400 includes, but is not limited to, at least part of components such as a radio frequency unit 401, a network module 402, an audio output unit 403, an input unit 404, a sensor 405, a display unit 406, a user input unit 407, an interface unit 408, a memory 409, and a processor 410.

A person skilled in the art may understand that the terminal 400 may further include a power supply (such as a battery) for supplying power to the various components, and the power supply may be logically connected to the processor 410 by a power management system, thereby implementing functions such as charging, discharging, and power consumption management by means of the power management system. The terminal structure shown in FIG. 4 does not constitute a limitation on the terminal, and the terminal may include components more or fewer than components shown in the figure, or combine some components, or have different component arrangements, which will not be described in detail here.

It is to be understood that, in this embodiment of this application, the input unit 404 may include a graphics processing unit (GPU) 4041 and a microphone 4042. The graphics processing unit 4041 performs processing on image data of a static picture or a video that is obtained by an image acquisition device (for example, a camera) in a video acquisition mode or an image acquisition mode. The display unit 406 may include a display panel 4061. The display panel 4061 may be configured in the form of a liquid crystal display (LCD), an organic light-emitting diode (OLED), or the like. The user input unit 407 includes a touch panel 4071 and another input device 4072. The touch panel 4071 is also called a touchscreen. The touch panel 4071 may include two parts: a touch detection apparatus and a touch controller. The another input device 4072 may include, but not limited to, a physical keyboard, a functional key (such as a volume control key or a switch key), a track ball, a mouse, and a joystick, which will not be described in detail here.

In this embodiment of this application, after downlink data from the network side device is received by the radio frequency unit 401, the downlink data is processed by the processor 410. In addition, uplink data is transmitted to the network side device. Generally, the radio frequency unit 401 includes, but is not limited to, an antenna, at least one amplifier, a transceiver, a coupler, a low noise amplifier, a duplexer, and the like.

The memory 409 may be configured to store a software program or instruction and various data. The memory 409 may mainly include a program or instruction storage area and a data storage area. The program or instruction storage area may store an operating system, an application program or instruction required by at least one function (for example, a sound playback function and an image display function), and the like. In addition, the memory 409 may include a high-speed random access memory, and may also include a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory, For example, at least one disk memory, a flash memory or another nonvolatile solid state memory.

The processor 410 may include one or more processing units. Optionally, the processor 410 may integrate an application processor and a modem processor. The application processor mainly processes an operating system, a user interface, an application program or instruction, and the like, and the modem processor mainly processes wireless communication, such as a baseband processor. It can be understood that, the modem processor described above may not be integrated into the processor 410.

The processor 410 is configured to implement the following:
in a case that a first condition is satisfied, a first operation is executed.
The first condition includes at least one of the following:
there is uplink data arriving at a secondary cell group (SCG) in a deactivated state;
the terminal receives an SCG activation command;
the terminal requests to activate the SCG;
the SCG is activated;
the terminal receives a bandwidth part (BWP) activation command; or
in the conversion process of the SCG from the deactivated state to an activated state,
the first operation includes at least one of the following:
a first target BWP of a first serving cell of the SCG is activated;
the first serving cell of the SCG is kept working in a first BWP; or
BWP switching from the first BWP to the first target BWP is executed for the first serving cell of the SCG, and
the first BWP is a BWP which the first serving cell works in or activates when the SCG is in the deactivated state.

For the terminal in this embodiment of this application, by limiting the terminal by reasonably processing the BWP of the serving cell of the SCG from the deactivated state to the activated state, the network communication process is improved in this way, and the reliability of communication between the terminal and the network side device can be ensured.

Optionally, in a case that the first operation is activating the first target BWP of the first serving cell of the SCG, the processor 410 is further configured to implement the following:

network configuration information is received, and a second operation is executed based on the network configuration information.

The network configuration information is used for configuring configuration parameters of a first activate BWP of a primary secondary cell; and the second operation is that the terminal does not activate a BWP indicated by the configuration parameters of the first activate BWP.

Optionally, the timing for receiving the network configuration information includes at least one of the following:

in a case that the SCG is in the deactivated state;

in a case that the SCG is added to the deactivated state; or in a case that the terminal receives an SCG deactivation command.

Optionally, in a case that the first operation is activating the first target BWP of the first serving cell of the SCG, the processor 410 is further configured to implement the following:

in a case that the SCG of the terminal is in the activated state and the primary secondary cell works in the second BWP, the second BWP of the primary secondary cell is deactivated after the SCG deactivation command is received.

Optionally, the processor 410 further configured to implement one of the following:

in a case that the SCG deactivation command includes the configuration parameters of the first active BWP of the primary secondary cell, the processor switches from the second BWP to the BWP indicated by the configuration parameters of the first active BWP, and deactivates the BWP indicated by the configuration parameters of the first active BWP; and in a case that the SCG deactivation command does not contain the configuration parameters of the first active BWP for the primary secondary cell, the processor deactivates the second BWP of the primary secondary cell and saves the second BWP.

Optionally, in a case that the first operation is keeping the first serving cell of the SCG working in the first BWP and/or executing BWP switching from the first BWP to the first target BWP for the first serving cell of the SCG, the processor 410 is further configured to implement the following:

in a case that the SCG of the terminal is in the activated state and the primary secondary cell works in a fifth BWP, a third operation is executed after the SCG deactivation command is received.

The third operation includes one of the following:

the first serving cell of the SCG is kept working in the fifth BWP; and

BWP switching from the fifth BWP to the first BWP is executed for the first serving cell of the SCG by the terminal.

Optionally, the first BWP includes one of the following:

a third BWP, the third BWP being a BWP used when the SCG is in the deactivated state;

a BWP configured with a first resource;

a default BWP;

an initial BWP;

a dormant BWP; and a first active BWP.

Optionally, the processor 410 is further configured to implement the following:

the fifth BWP is saved.

Optionally, the processor 410 is further configured to implement the following:

in a case that the terminal receives the configuration parameters of the first active BWP when the SCG is in the deactivated state, a fourth operation is executed.

The fourth operation includes one of the following:

the BWP indicated by the configuration parameters of the first activate BWP is activated; and the BWP indicated by the configuration parameters of the first active BWP is activated after the SCG is activated.

Optionally, the first target BWP includes one of the following:

the first active BWP;

a fourth BWP, the fourth BWP being a BWP used when the SCG is activated;

the default BWP;

the initial BWP;

the dormant BWP;

a BWP configured with a second resource; and a BWP saved by the terminal that was used last time in the activated state.

Optionally, the second resource includes at least one of the following:

a physical uplink control channel (PUCCH) resource;

a physical random access channel (PRACH) resource;

a channel state information (CSI) measurement resource; or a CSI report resource.

Optionally, the processor 410 is further configured to implement the following:

in a case that the SCG is in the activated state, the SCG deactivation command is received and a fifth operation is executed.

The fifth operation includes one of the following:

in a case that the BWP-inactivity timer is in operation, the BWP inactivity timer is stopped;

the BWP-inactivity timer is not stopped, and after the BWP-inactivity timer times out, BWP switching is not executed;

the BWP-inactivity timer is not stopped, and after the BWP-inactivity timer times out, BWP switching is executed in a case that the terminal is configured with the default BWP, otherwise BWP switching is not executed; and the BWP-inactivity timer is not stopped, and after the BWP-inactivity timer times out, BWP switching is executed in a case that the terminal is not configured with the default BWP, otherwise, BWP switching is not executed.

Optionally, the processor 410 is configured to implement the following:

by means of the radio frequency unit 401, first configuration information transmitted by a network side device is received; and in a case that the first configuration information indicates the fifth operation, the fifth operation is executed.

Optionally, the first resource is used for at least one of the following:

radio link monitoring (RLM), beam failure detection (BFD), beam management, channel state information (CSI) measurement, CSI report, random access, physical uplink control channel (PUCCH) transmission, physical uplink shared channel (PUSCH) transmission, or sounding reference signal (SRS) transmission.

Preferably, an embodiment of this application further provides a terminal, including a processor, a memory, and programs or instructions stored on the memory and capable of running on the processor. The program or instruction, when executed by the processor, implements the various processes of the method embodiment for processing BWPs, and the same technical effect can be achieved, details of which are omitted here for brevity.

An embodiment of this application further provides a readable storage medium, and programs or instructions are stored on the readable storage medium. The program or instruction, when executed by a processor, implements the various processes of the method embodiment for processing BWPs, and the same technical effect can be achieved, details of which are omitted here for brevity. The computer-readable storage medium may be, for example, a read-only memory (ROM), a random access memory (RAM), a magnetic disk, or an optical disc, or the like.

Figure 5:
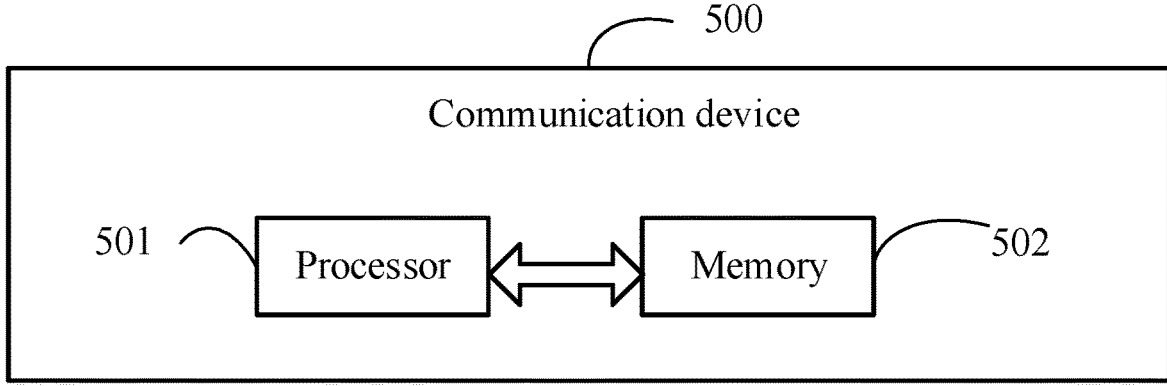
FIG. 5 is a structural block diagram of a communication device according to an embodiment of this application.

Optionally, as shown in FIG. 5, an embodiment of this application further provides a communication device 500, including a processor 501, a memory 502, programs or instructions stored on the memory 502 and capable of running on the processor 501. For example, when the communication device 500 is a terminal, the program or instruction, when executed by the processor 501, implements the various processes of the method embodiment for processing BWPs, and the same technical effect can be achieved, details of which are omitted here for brevity.

The terminal involved in this embodiment of this application may be a device that provides voice and/or data connectivity to a user, a handheld device with a wireless connection function or another processing device connected to a wireless modem. The name of the terminal device may also be different in different systems, for example, in 5G systems, the terminal device may be called user equipment (UE). A wireless terminal device may communicate with one or more core networks (CN) through a radio access network (RAN). The wireless terminal device may be a mobile terminal device such as a mobile phone (also referred to as a "cellular" phone) and a computer with a mobile terminal device, for example, a portable, pocket-sized, handheld, computer built-in, or in-vehicle mobile device, which exchanges languages and/or data with the RAN. For example, the device may be a personal communication service (PCS) phone, a cordless phone, a session initiated protocol (SIP) phone, a wireless local loop (WLL) station, a personal digital assistant (PDA) and the like. The wireless terminal device can also be called a system, a subscriber unit, a subscriber station, a mobile station, a mobile, a remote station, an access point, a remote terminal, an access terminal, a user terminal, a user agent, and a user device, which is not limited in this embodiment of this application.

The network side device involved in this embodiment of this application may be a base transceiver station (BTS) in a global system of mobile communication (GSM) or a code division multiple access (CDMA), or may be a NodeB (NodeB, NB) in a wideband code division multiple access (WCDMA), or may be an evolutional node B (Evolutional Node B, eNB or eNodeB) in LTE, or a relay station or an access point, or a base station in a future 5G network, or the like, which is not limited herein.

Multi input multi output (MIMO) transmissions can be performed between the network side device and the terminal by respectively using one or more antennas, and the MIMO transmissions can be single user MIMO (SU-MIMO) or multiple user MIMO (MU-MIMO). Depending on the shape and number of root antenna combinations, the MIMO transmission can be two dimension multiple input multiple output (2D-MIMO), three dimension multiple input multiple output (3D-MIMO), full dimension multiple input multiple output (FD-MIMO), or massive multiple input multiple output (massive-MIMO), and can also be diversity transmission or precoded transmission or beam forming transmission, etc.

An embodiment of this application further provides a chip, the chip including a processor and a communication interface. The communication interface is coupled to the processor, the processor is configured to run programs or instructions to implement the various processes of the embodiment of the method for processing BWPs, and the same technical effect can be achieved, details of which are omitted here for brevity.

It should be understood that the chip referred to in this embodiment of this application may also be referred to as a system-on-chip, a system chip, a chip system, a system-on-a-chip, or the like.

It is to be noted that: the terms "include", "contain", or any other variants thereof in this specification are intended to cover a non-exclusive inclusion, such that a process, method, object, or apparatus including a set of elements includes not only those elements, but also other elements that are not expressly listed or elements that are inherent to such process, method, object, or apparatus. Without more limitations, elements defined by the sentence "including one" does not exclude that there are still other same elements in the processes, methods, objects, or apparatuses including the element. Furthermore, it is noted that the scope of the method and apparatus in the embodiments of this application is not limited to executing the functions in the order shown or discussed, but may also include executing the functions in a substantially same manner or in the reverse order according to the functions involved, for example, the described method may be executed in an order different from the order described, and various steps may also be added, omitted, or combined. In addition, features described with reference to some examples may also be combined in other examples.

According to the descriptions in the foregoing implementations, a person skilled in the art may clearly learn that the method according to the foregoing embodiment may be implemented by relying on software and an essential common hardware platform or, of course, by using hardware, however, in many cases the former is the better way to implement the method. Based on such an understanding, the technical solutions of this application essentially, or the part contributing to the prior art, may be presented in the form of a software product. The computer software product is stored in a storage medium (for example, ROM/RAM, a magnetic disk, or an optical disc) including several instructions to enable a terminal (which may be a mobile phone, a computer, a server, an air conditioner, a network device, or the like) to execute the methods described in the various embodiments of this application.

The embodiments of this application have been described above with reference to the accompanying drawings. The present disclosure is not limited to the specific embodiments described above, and the specific embodiments described above are merely exemplary and not restrictive. Those of ordinary skill in the art may make various variations under the teaching of this application without departing from the spirit of this application and the protection scope of the claims, and such variations all fall within the protection scope of this application.

What is claimed is:

1. A method for processing bandwidth parts (BWPs), comprising:

in a case that a first condition is satisfied, executing, by a terminal, a first operation, wherein the first condition comprises at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation comprises at least one of the following:

activating a first target BWP of a first serving cell of the SCG;

keeping the first serving cell of the SCG working in a first BWP; or executing BWP switching from the first BWP to the first target BWP for the first serving cell of the SCG, the first BWP being a BWP which the first serving cell works in or activates when the SCG is in the deactivated state.

2. The method according to claim 1, in a case that the first operation is activating the first target BWP of the first serving cell of the SCG, before the executing, by a terminal, a first operation, further comprising:

receiving, by the terminal, network configuration information, and executing, based on the network configuration information, a second operation, wherein the network configuration information is used for configuring configuration parameters of a first activate BWP of a primary secondary cell; and the second operation is that the terminal does not activate a BWP indicated by the configuration parameters of the first activate BWP.

3. The method according to claim 2, wherein the timing for the terminal to receive the network configuration information comprises at least one of the following:

in a case that the SCG is in the deactivated state;

in a case that the SCG is added to the deactivated state; or in a case that the terminal receives an SCG deactivation command.

4. The method according to claim 1, in a case that the first operation is activating the first target BWP of the first serving cell of the SCG, before the executing, by a terminal, a first operation, further comprising:

in a case that the SCG of the terminal is in the activated state and a primary secondary cell works in a second BWP, deactivating the second BWP of the primary secondary cell after the terminal receives an SCG deactivation command.

5. The method according to claim 4, wherein the deactivating the second BWP of the primary secondary cell comprises one of the following:

in a case that the SCG deactivation command contains configuration parameters of a first active BWP of the primary secondary cell, the terminal switches from the second BWP to a BWP indicated by the configuration parameters of the first active BWP, and deactivates the BWP indicated by the configuration parameters of the first active BWP; and in a case that the SCG deactivation command does not contain the configuration parameters of the first active BWP of the primary secondary cell, the terminal deactivates the second BWP of the primary secondary cell and saves the second BWP.

6. The method according to claim 1, in a case that the first operation is keeping the first serving cell of the SCG working in the first BWP and/or executing BWP switching from the first BWP to the first target BWP for the first serving cell of the SCG, before the executing, by a terminal, a first operation, further comprising:

in a case that the SCG of the terminal is in the activated state and a primary secondary cell works in a fifth BWP, after receiving an SCG deactivation command, executing, by the terminal, a third operation, wherein the third operation comprises one of the following:

keeping the first serving cell of the SCG working in the fifth BWP; and executing BWP switching from the fifth BWP to the first BWP for the first serving cell of the SCG by the terminal.

7. The method according to claim 6, wherein the first BWP comprises one of the following:

a third BWP, the third BWP being a BWP used when the SCG is in the deactivated state;

a BWP configured with a first resource; wherein the first resource is used for at least one of the following: radio link monitoring (RLM), beam failure detection (BFD), beam management, channel state information (CSI) measurement, CSI report, random access, physical uplink control channel (PUCCH) transmission, physical uplink shared channel (PUSCH) transmission, or sounding reference signal (SRS) transmission;

a default BWP;

an initial BWP;

a dormant BWP; and a first active BWP.

8. The method according to claim 6, further comprising: saving, by the terminal, the fifth BWP;

or, in a case that the terminal receives configuration parameters of the first active BWP when the SCG is in the deactivated state, executing, by the terminal, a fourth operation, wherein the fourth operation comprises one of the following:

activating a BWP indicated by the configuration parameters of the first activate BWP; and activating the BWP indicated by the configuration parameters of the first active BWP after the SCG is activated.

9. The method according to claim 1, wherein the first target BWP comprises one of the following:

the first active BWP;

a fourth BWP, the fourth BWP being a BWP used when the SCG is activated;

the default BWP;

the initial BWP;

the dormant BWP;

a BWP configured with a second resource; wherein the second resource comprises at least one of the following: a physical uplink control channel (PUCCH) resource; a physical random access channel (PRACH)

resource; a channel state information (CSI) measurement resource; or a CSI report resource; and a BWP saved by the terminal that was used last time in the activated state.

10. The method according to claim 1, before the executing, by a terminal, a first operation, further comprising:

in a case that the SCG is in the activated state, receiving the SCG deactivation command and executing, by the terminal, a fifth operation, wherein the fifth operation comprises one of the following:

in a case that a BWP-inactivity timer is in operation, stopping the BWP-inactivity timer;

not stopping the BWP-inactivity timer, and after the BWP-inactivity timer times out, not executing BWP switching;

not stopping the BWP-inactivity timer, and after the BWP-inactivity timer times out, executing BWP switching in a case that the terminal is configured with the default BWP, otherwise not executing BWP switching; and not stopping the BWP-inactivity timer, and after the BWP-inactivity timer times out, executing BWP switching in a case that the terminal is not configured with the default BWP, otherwise not executing BWP switching.

11. A terminal, comprising a processor, a memory, and programs or instructions stored on the memory and capable of running on the processor, the program or instruction, when executed by the processor, causes the terminal to perform:

in a case that a first condition is satisfied, executing a first operation, wherein the first condition comprises at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation comprises at least one of the following:

activating a first target BWP of a first serving cell of the SCG;

keeping the first serving cell of the SCG working in a first BWP; or executing BWP switching from the first BWP to the first target BWP for the first serving cell of the SCG, the first BWP being a BWP which the first serving cell works in or activates when the SCG is in the deactivated state.

12. The terminal according to claim 11, wherein in a case that the first operation is activating the first target BWP of the first serving cell of the SCG, before the executing a first operation, the program or instruction, when executed by the processor, causes the terminal to further perform:

receiving network configuration information, and executing, based on the network configuration information, a second operation, wherein the network configuration information is used for configuring configuration parameters of a first activate BWP of a primary secondary cell; and the second operation is that the terminal does not activate a BWP indicated by the configuration parameters of the first activate BWP.

13. The terminal according to claim 12, wherein timing for the terminal to receive the network configuration information comprises at least one of the following:

in a case that the SCG is in the deactivated state;

in a case that the SCG is added to the deactivated state; or in a case that the terminal receives an SCG deactivation command.

14. The terminal according to claim 11, wherein in a case that the first operation is activating the first target BWP of the first serving cell of the SCG, before the executing a first operation, the program or instruction, when executed by the processor, causes the terminal to further perform:

in a case that the SCG of the terminal is in the activated state and a primary secondary cell works in a second BWP, deactivating the second BWP of the primary secondary cell after the terminal receives an SCG deactivation command.

15. The terminal according to claim 11, wherein in a case that the first operation is keeping the first serving cell of the SCG working in the first BWP and/or executing BWP switching from the first BWP to the first target BWP for the first serving cell of the SCG, before the executing a first operation, the program or instruction, when executed by the processor, causes the terminal to further perform:

in a case that the SCG of the terminal is in the activated state and a primary secondary cell works in a fifth BWP, after receiving an SCG deactivation command, executing a third operation, wherein the third operation comprises one of the following:

keeping the first serving cell of the SCG working in the fifth BWP; and executing BWP switching from the fifth BWP to the first BWP for the first serving cell of the SCG by the terminal.

16. The terminal according to claim 15, wherein the first BWP comprises one of the following:

a third BWP, the third BWP being a BWP used when the SCG is in the deactivated state;

a BWP configured with a first resource; wherein the first resource is used for at least one of the following: radio link monitoring (RLM), beam failure detection (BFD), beam management, channel state information (CSI) measurement, CSI report, random access, physical uplink control channel (PUCCH) transmission, physical uplink shared channel (PUSCH) transmission, or sounding reference signal (SRS) transmission;

a default BWP;

an initial BWP;

a dormant BWP; and a first active BWP.

17. The terminal according to claim 15, wherein the program or instruction, when executed by the processor, causes the terminal to further perform:

saving the fifth BWP;

or, in a case that the terminal receives configuration parameters of the first active BWP when the SCG is in the deactivated state, executing a fourth operation, wherein the fourth operation comprises one of the following:

activating a BWP indicated by the configuration parameters of the first activate BWP; and activating the BWP indicated by the configuration parameters of the first active BWP after the SCG is activated.

18. The terminal according to claim 11, wherein the first target BWP comprises one of the following:

the first active BWP;

a fourth BWP, the fourth BWP being a BWP used when the SCG is activated;

the default BWP;

the initial BWP;

the dormant BWP;

a BWP configured with a second resource; wherein the second resource comprises at least one of the following: a physical uplink control channel (PUCCH) resource; a physical random access channel (PRACH) resource; a channel state information (CSI) measurement resource; or a CSI report resource; and a BWP saved by the terminal that was used last time in the activated state.

19. The terminal according to claim 11, wherein before the executing a first operation, the program or instruction, when executed by the processor, causes the terminal to further perform:

in a case that the SCG is in the activated state, receiving the SCG deactivation command and executing a fifth operation, wherein the fifth operation comprises one of the following:

in a case that a BWP-inactivity timer is in operation, stopping the BWP-inactivity timer;

not stopping the BWP-inactivity timer, and after the BWP-inactivity timer times out, not executing BWP switching;

not stopping the BWP-inactivity timer, and after the BWP-inactivity timer times out, executing BWP switching in a case that the terminal is configured with the default BWP, otherwise not executing BWP switching; and not stopping the BWP-inactivity timer, and after the BWP-inactivity timer times out, executing BWP switching in a case that the terminal is not configured with the default BWP, otherwise not executing BWP switching;

wherein when executing a fifth operation, the program or instruction, when executed by the processor, causes the terminal to further perform:

receiving first configuration information transmitted by a network side device; and in a case that the first configuration information indicates the fifth operation, executing the fifth operation.

20. A non-transitory readable storage medium, programs or instructions being stored on the readable storage medium, and the program or instruction, when executed by a processor, implementing:

in a case that a first condition is satisfied, executing a first operation, wherein the first condition comprises at least one of the following:

there is uplink data arriving at a secondary cell group (SCG) in a deactivated state;

the terminal receives an SCG activation command;

the terminal requests to activate the SCG;

the SCG is activated;

the terminal receives a bandwidth part (BWP) activation command; or in the conversion process of the SCG from the deactivated state to an activated state, the first operation comprises at least one of the following:

activating a first target BWP of a first serving cell of the SCG;

keeping the first serving cell of the SCG working in a first BWP; or executing BWP switching from the first BWP to the first target BWP for the first serving cell of the SCG, the first BWP being a BWP which the first serving cell works in or activates when the SCG is in the deactivated state.

* * * * *